(12) United States Patent
Sugimura (10) Patent No.: US 11,984,656 B2
(45) Date of Patent: May 14, 2024

(54) RF TAG ANTENNA, RF TAG, TIRE PROVIDED WITH RF TAG, AND TIRE WITH BUILT-IN RF TAG

(71) Applicant: PHOENIX SOLUTION CO., LTD., Kanazawa (JP)

(72) Inventor: Shiro Sugimura, Kanazawa (JP)

(73) Assignee: PHOENIX SOLUTION CO., LTD., Ishikawa (JP)

( * ) Notice: Subject to any disclaimer, the term of this patent is extended or adjusted under 35 U.S.C. 154(b) by 589 days.

(21) Appl. No.: 17/278,909

(22) PCT Filed: Sep. 30, 2019

(86) PCT No.: PCT/JP2019/038534
§ 371 (c)(1),
(2) Date: Mar. 23, 2021

(87) PCT Pub. No.: WO2020/090319
PCT Pub. Date: May 7, 2020

(65) Prior Publication Data
US 2022/0051069 A1    Feb. 17, 2022

(30) Foreign Application Priority Data
Oct. 29, 2018   (JP) ................. 2018-202604

(51) Int. Cl.
*H01Q 1/48* (2006.01)
*G06K 19/077* (2006.01)
(Continued)

(52) U.S. Cl.
CPC ......... *H01Q 1/48* (2013.01); *G06K 19/07764* (2013.01); *H01Q 1/2241* (2013.01); *H01Q 1/50* (2013.01)

(58) Field of Classification Search
CPC .. H01Q 1/2208; H01Q 1/2225; H01Q 1/2241; H01Q 1/48; B60C 23/00
See application file for complete search history.

(56) References Cited

U.S. PATENT DOCUMENTS

| | | |
|---|---|---|
| 5,500,065 A | 3/1996 | Koch et al. |
| 2007/0103285 A1 | 5/2007 | Konno et al. |
| 2018/0032853 A1 | 2/2018 | Sugimura et al. |

FOREIGN PATENT DOCUMENTS

| | | |
|---|---|---|
| JP | H08-067117 A | 3/1996 |
| JP | 2003-085523 A | 3/2003 |

(Continued)

OTHER PUBLICATIONS

International Search Report for PCT/JP2019/038534 dated Nov. 19, 2019.
(Continued)

*Primary Examiner* — Robert Karacsony
(74) *Attorney, Agent, or Firm* — PEARNE & GORDON LLP (57) ABSTRACT

[Problem] To provide: an RF tag antenna which is able to be fitted to a tire that contains a steel wire and a carbon powder; an RF tag; a tire which is provided with an RF tag; and a tire with a built-in RF tag. [Solution] An RF tag antenna 10 according to the present invention is used by being fitted to a tire 920 that contains a steel wire 925 and a carbon powder; and the RF tag antenna 10 comprises a ground part 30 and a potential difference formation part 20. The potential difference formation part 20 and the ground part 30 constitute a resonant circuit (LC); and the ground part 30 is electrically connected to the steel wire 925.

17 Claims, 8 Drawing Sheets

(51) Int. Cl.
*H01Q 1/22* (2006.01)
*H01Q 1/50* (2006.01)

(56) References Cited

FOREIGN PATENT DOCUMENTS

| | | |
|---|---|---|
| JP | 2007-126026 A | 5/2007 |
| WO | 2016/129542 A1 | 8/2016 |

OTHER PUBLICATIONS

Setsuya Isshiki, "Electrical Conductivity of Carbon Black Composition Rubber Mixtures", Nippon Gomu Kyokaishi, 1957, p. 206-218, vol. 30, No. 3, Japan.

RF TAG ANTENNA, RF TAG, TIRE PROVIDED WITH RF TAG, AND TIRE WITH BUILT-IN RF TAG

TECHNICAL FIELD

The present invention relates to an RF tag antenna, an RF tag, a tire provided with an RF tag, and a tire with a built-in RF tag.

BACKGROUND ART

Recently, radio frequency identification (RFID) technology is being used in management systems that manage operations such as inventory and logistics for products, components, and the like. In such a system using RFID technology, wireless communication occurs between an RF tag and a reader/writer (hereinafter referred to as the reading device), and data such as identification information stored in the RF tag is read by the reading device.

For example, Patent Literature 1 (Japanese Patent Laid-Open No. 2012-253700) facilitates the installation of radiant conductors and ground conductors, and discloses a wireless communication device that improves the connection reliability between conductors, as well as a method of manufacturing the same and a metal object provided with the wireless communication device.

The wireless communication device described in Patent Literature 1 is a wireless communication device provided with an inverted-F antenna comprising: a dielectric block having a first principal surface and a second principal surface opposite the first principal surface; a radiant conductor provided on the first principal surface of the dielectric block; a ground conductor provided on the second principal surface of the dielectric block; a feeding conductor connecting a wireless IC element that processes a high-frequency signal to the radiant conductor and the ground conductor; and a short-circuit conductor connecting the radiant conductor and the ground conductor; wherein at least the radiant conductor, the ground conductor, the feeding conductor, and the short-circuit conductor are configured as a metal conductor such that each has a tabular shape, in the metal conductor, the radiant conductor portion is disposed in the first principal surface of the dielectric block, the ground conductor portion is disposed in the second principal surface of the dielectric block, the feeding conductor portion is disposed mainly on a lateral surface of the dielectric block, and the short-circuit conductor portion is disposed mainly on a lateral surface of the dielectric block.

Patent Literature 2 (Japanese Patent Laid-Open No. 2007-124696) discloses a low-profile wideband antenna device that is also usable in communication systems requiring an ultra-wideband and compact antenna device, such as a broadband personal area network (broadband-PAN) utilizing ultra-wideband (UWB) technology.

The wideband antenna device described in Patent Literature 2 is a wideband antenna device provided with a conducting ground plate and a radiant conducting plate arranged such that at least a portion of the plates face opposite each other, wherein a magnetic body having a relative permeability greater than 1 and generally 8 or less in the radio frequencies to be used is interposed between the conducting ground plate and the radiant conducting plate.

Patent Literature 3 (Japanese Patent Laid-Open No. 2013-110685) discloses a thin antenna for reading an RFID tag, in which radio waves in the UHF band are used and favorable communication can be achieved even if the RFID tag is attached to a metal member.

A thin antenna tire described in Patent Literature 3 is provided with a magnetic sheet, an antenna part disposed on one face of the magnetic sheet, and a conducting ground plate disposed on another face of the magnetic sheet, wherein the antenna part and the conducting ground plate are disposed to overlap at least partially when viewing the magnetic sheet in the thickness direction, and the thickness of the magnetic sheet is 200 μm or greater and 600 μm or less.

Patent Literature 4 (Japanese Patent Laid-Open No. 2004-013399) describes a tire antenna device and a tire having a communication function capable of improving the communication performance between a communication device provided in a tire and an external communication device, in which arbitrary points C and D on a belt 2 attached around the circumference of a tire 100 are connected by a bypass wire 82, and a communication circuit unit 81 is connected to the bypass wire 82, thereby causing a part of the belt 2 to function as a loop antenna, and in addition, a magnetic body 83 is provided near the belt 2 between the points C and D.

Patent Literature 5 (Japanese Translation of PCT International Application Publication No. 2005-535497) describes an RFID chip housed inside a rubber tire, in which the RFID chip is attached to the interior of the rubber tire and is also capacitively coupled to a conductive belt housed inside the tire to provide an antenna for radio communication and receiving.

Patent Literature 6 (Japanese Patent Laid-Open No. 2002-264617) describes a structure for installing an RFID tag in a tire such that communication with the internal RFID tag is possible from any direction around the circumference of the tire due to a loop antenna action, the communication range is also extended, and furthermore, a detection value from an internal state detection unit disposed inside the tire can be read easily from the outside. A loop antenna 8 is provided along the circumferential direction of a tire 7, an RFID tag 1a including a detection coil 9a that forms a series circuit with the loop antenna 8 and an antenna coil 2a electromagnetically coupled to the detection coil 9a is provided, and additionally, an internal state detection unit 11 that detects properties such as the air pressure and internal temperature is installed inside the tire 7 and connected to the RFID tag 1a.

Patent Literature 7 (Japanese Patent Laid-Open No. 10-166820) describes a tire provided with transponder capable of increasing the communication range with the transponder without raising the transmission output of the interrogator by using a coiled conductive wire used in an outer periphery inside the tire as an antenna connected directly to the transponder. A transponder 3 and a wire 131 inside a jointless belt 13A disposed in an outer periphery inside the tire are directly connected electrically, thereby causing the wire to act as a receiving and transmitting antenna of the transponder 3.

CITATION LIST

Patent Literature

Patent Literature 1: Japanese Patent Laid-Open No. 2012-253700
Patent Literature 2: Japanese Patent Laid-Open No. 2007-124696

Patent Literature 3: Japanese Patent Laid-Open No. 2013-110685
Patent Literature 4: Japanese Patent Laid-Open No. 2004-013399
Patent Literature 5: Japanese Translation of PCT International Application Publication No. 2005-535497
Patent Literature 6: Japanese Patent Laid-Open No. 2002-264617
Patent Literature 7: Japanese Patent Laid-Open No. 10-166820

SUMMARY OF INVENTION

Technical Problem

Patent Literature 1 discloses an inverted-F RF tag antenna. However, there is a problem of being unable to read at long distances even if a dielectric is used.

Also, Patent Literature 2 and 3 have complicated structures, such as for feeding power by using coaxial lines or striplines, and consequently there is a problem of increasing manufacturing costs, and furthermore, it is difficult to adjust the resonant frequency according to the application.

Moreover, Patent Literature 1 to 3 do not describe attaching an antenna to a tire that contains carbon powder.

Paragraph [0033] of the specification in Patent Literature 4 states: "The magnetic body 83 is provided on the belt 2 between the point C and the point D on the belt 2. The magnetic body 83 is provided to bring a part of the belt 2 close to an electrically isolated state." Consequently, it is necessary to provide the magnetic body 83 to bring a part (2a) of the belt 2 close to an electrically isolated state, and thus there is a problem of increased manufacturing costs, and there is a further problem in that the configuration is only applicable to a loop antenna.

Paragraph [0026] of the specification in Patent Literature 5 states: "It is also beneficial for the RFID chip 10 to be earthed to the contact patch (not illustrated). It is beneficial to provide the contact patch (not illustrated) between the RFID chip 10 and the surface of the tire 50." Consequently, it is necessary to not only capacitively couple an antenna pin 11 to a conductive belt 74, but also connect an earth pin 16 to the contact patch provided between the RFID chip 10 and the surface of the tire 50, which makes the structure complicated and also has a problem of increased manufacturing costs.

Patent Literature 6 has a problem of being limited to a loop antenna in application, and in addition, a large-diameter loop antenna 8 must be embedded along the circumferential direction of the tire, and the antenna coil 2 and the detection coil 9 must be added, which makes the structure complicated and also has a problem of increased manufacturing costs.

Furthermore, paragraph [0010] of the specification in Patent Literature 7 states: "There is proposed a tire provided with a transponder in which a conductive wire of a jointless belt is connected as an antenna of the transponder, and also in which the rubber of the belt strip is non-conductive rubber." Consequently, application is limited to "a tire provided with transponder in which the rubber of the belt strip is non-conductive rubber", and there is a problem of being unable to use an RF tag with a tire that uses conductive carbon powder.

Also, there is a problem in that if a typical RF tag is brought close to a tire containing carbon powder, the resonant frequency is shifted and communication is hindered, or a problem in which communication with the RF tag is faulty due to the tire containing carbon powder.

A main object of the present invention is to provide an RF tag antenna, an RF tag, a tire provided with an RF tag, and a tire with a built-in RF tag capable of communication when the RF tag is attached to a tire containing a steel wire and carbon powder.

Solution to Problem (1)

An RF tag antenna according to one aspect is an RF tag antenna used by being attached to a tire including carbon powder and a steel wire, the RF tag antenna comprising: a ground part; and a potential difference formation part that forms a potential difference with respect to the ground part, wherein the potential difference formation part and the ground part are disposed opposite each other with a spacer containing an insulator in between, a resonant circuit that resonates in a frequency band of radio waves to be received is formed by an inductance of the RF tag antenna and a capacitance of a capacitor formed by the potential difference formation part, the ground part, and the spacer, and only the ground part has electrical continuity with the steel wire.

In this case, the spacer makes it possible to provide a space that forms a potential difference between the potential difference formation part and the ground part. Also, by using a spacer containing an insulator, the shape of the space that forms the potential difference can be stabilized. For the insulator, polystyrene foam, ceramic, or any other material may be used.

Generally, a tire containing carbon powder is a conductor with high resistance, and therefore radio wave absorption occurs and communication with an RF tag is unavailable.

However, in the present invention, by forming a high impedance between the potential difference formation part and the ground part and additionally connecting the ground part to the steel wire of the tire, the tire containing the steel wire and the carbon powder can be used as a part of the antenna.

Furthermore, a resonant circuit that resonates in the frequency band of received radio waves is formed by the inductance of the RF tag antenna and a capacitor formed by the potential difference formation part, the ground part, and the spacer, while in addition, the ground part has continuity with the steel wire, and therefore variations in the resonant frequency due to inconsistencies of the tire containing the carbon powder can be prevented.

In addition, by the above two effects, the RF tag antenna according to one aspect is capable of communicating with the RF tag even from outside the tire, and furthermore, communication is possible even if tires are stacked.

(2)

An RF tag antenna according to a second aspect may be configured such that, in the RF tag antenna according to the first aspect, the antenna structure is a planar inverted-F antenna, and is provided with a short-circuit part that provides electrical continuity between the potential difference formation part and the ground part on a lateral surface of the spacer, and a feeding part that feeds power to the potential difference formation part and the ground part.

In this case, by adopting the planar inverted-F antenna, a low-profile RF tag antenna is achieved easily.

(3)

An RF tag antenna according to a third aspect may be configured such that, in the RF tag antenna according to the second aspect, an inductance is formed by the potential difference formation part, the ground part, the short-circuit part, and the feeding part.

In this case, by treating the short-circuit part and the feeding part on a lateral surface of the spacer as a part of the inductor, the inductance value of the RF tag antenna can be increased easily.

(4)

An RF tag antenna according to a fourth aspect may be configured such that, in the RF tag antenna according to the first aspect, the antenna structure is an inverted-L antenna, a patch antenna, or a helical antenna.

In the present invention, besides a planar inverted-F antenna, an inverted-L antenna, a patch antenna, or a helical antenna can be adopted as the structure of the RF tag antenna, and a wide variety of applications can be accommodated.

(5)

An RF tag antenna according to a fifth aspect may be configured such that, in the RF tag antenna according to any one of the first to fourth aspects, the ground part and the potential difference formation part are each formed from a continuous flat plate.

In this case, the ground part and the potential difference formation part are formed from a continuous flat plate, and therefore can be formed from a single flat plate. In other words, the ground part and the potential difference formation part can be manufactured easily.

(6)

An RF tag antenna according to a sixth aspect may be configured such that, in the RF tag antenna according to any one of the first to fifth aspects, a total length of the sides of the potential difference formation part is one of $\lambda/4$, $\lambda/2$, $3\lambda/4$, or $5\lambda/8$, where $\lambda$ is a wavelength of a radio wave to be transmitted from a reading device.

In this case, by treating the total length of the sides of the potential difference formation part one of $\lambda/4$, $\lambda/2$, $3\lambda/4$, or $5\lambda/8$, the resonant frequency of the planar inverted-F antenna can be tuned to the frequency of radio waves transmitted from the reading device, and the communication performance is improved.

(7)

An RF tag antenna with a connecting member according to a seventh aspect is an RF tag antenna with a connecting member comprising the RF tag antenna according to any one of the first to sixth aspects and a conductive connecting member, wherein the ground part of the RF tag antenna is closely secured to an inner circumferential surface of the tire, and the steel wire and the ground part have electrical continuity through the conductive connecting member.

In this case, by closely securing the ground part of the RF tag antenna to the inner circumferential surface of the tire, the RF tag antenna can be secured to the inner circumferential surface of the tire easily and surely, and additionally, by causing the ground part to have electrical continuity with the steel wire of the tire through a conductive connecting member, the tire containing the steel wire and the carbon powder can be used as a part of the antenna.

(8)

The RF tag antenna with a connecting member according to an eighth aspect may be configured such that, in the RF tag antenna with a connecting member according to the seventh aspect, a connection point between the conductive connecting member and the ground part is disposed near the feeding part on the ground part side.

In this case, the radio waves absorbed by the steel wire can be sent into the feeding part of the RF tag more efficiently, and additionally, radio waves sent out from the feeding part of the RF tag can be radiating from the steel wire more efficiently.

(9)

An RF tag antenna according to a ninth aspect is an RF tag antenna with a shock and vibration absorption member comprising the RF tag antenna according to any one of the first to sixth aspects and a conductive shock and vibration absorption member, wherein the ground part of the RF tag antenna with a shock and vibration absorption member is secured at a distance from an inner circumferential surface of the tire by the shock and vibration absorption member, and the ground part and the steel wire have electrical continuity through the shock and vibration absorption member.

In this case, because the ground part of the RF tag antenna is secured at a distance from the inner circumferential surface of the tire by the shock and vibration absorption member, flexion and vibration of the tire can be absorbed by the shock and vibration absorption member.

(10)

An RF tag antenna according to a 10th aspect may be configured such that, in the RF tag antenna with a shock and vibration absorption member according to the ninth aspect, the shock and vibration absorption member is formed using stainless steel, a leaf spring, phosphor bronze, carbon fiber, or a conductive resin.

In this case, the necessary springiness or flexural strength to act as the shock and vibration absorption member and a high enough electrical conductivity needed to use the steel wire as an antenna can be achieved at the same time.

(11)

An RF tag according to an 11th aspect comprises the RF tag antenna according to any one of the first to sixth aspects, and an IC chip provided in the RF tag antenna.

(12)

An RF tag according to a 12th aspect comprises the RF tag antenna with a connecting member according to any one of the seventh or eighth aspect, and an IC chip provided in the RF tag antenna with a connecting member.

(13)

An RF tag according to a 13th aspect comprises the RF tag antenna with a shock and vibration absorption member according to any one of the ninth or 10th aspect, and an IC chip provided in the RF tag antenna with a shock and vibration absorption member.

In the 11th to 13th aspects, by providing an IC chip in the RF tag antenna, a more compact RF tag can be achieved.

(14)

A tire according to a 14th aspect is a tire provided with the RF tag according to the 12th or 13th aspect.

With the tire according to the 14th aspect, the RF tag is provided in the tire itself, communication with the RF tag is possible even from outside the tire, and furthermore, communication is possible even if tires are stacked, thereby making it possible to manage tires efficiently.

(15)

A tire with a built-in RF tag according to a 15th aspect contains the RF tag according to the 11th aspect, wherein the ground part of the RF tag antenna is directly secured to the steel wire inside the tire, and the RF tag is embedded closer to an inner circumferential surface than the steel wire in the tire with a built-in RF tag.

In this case, the entire RF tag is built into the tire and the ground part of the RF tag antenna is secured directly to the steel wire, thereby forming an RF tag that is resilient against shock and vibration of the tire.

(16)

A tire with a built-in RF tag according to a 16th aspect may be configured such that, in the tire with a built-in RF tag according to the 15th aspect, at least the potential difference formation part of the RF tag antenna is disposed inside an antenna protection radome using a bubble material or an insulator having a low dielectric constant, and is configured so as not to contact the rubber of the tire with a built-in RF tag directly.

In this case, the portions other than the ground part of the RF tag antenna are less susceptible to the effects of the tire containing carbon powder, and radio waves are absorbed/radiated by the potential difference formation part more efficiently. Furthermore, variations in the resonant frequency due to inconsistencies in the tire components are reduced, and the transmission and reception sensitivity of the RF tag can be improved further.

(17)

A tire with a built-in RF tag according to a 17th aspect may be configured such that, in the tire with a built-in RF tag according to the 16th aspect, the potential difference formation part of the RF tag antenna is disposed at a predetermined distance from the antenna protection radome, and is configured so as not to contact the antenna protection radome directly.

In this case, the potential difference formation part of the RF tag antenna is less susceptible to the effects of the antenna protection radome, radio waves are absorbed/radiated by the potential difference formation part more efficiently, and the transmission and reception sensitivity of the RF tag can be improved further.

DESCRIPTION OF EMBODIMENTS

Hereinafter, exemplary embodiments of the invention will be described with reference to the drawings. In the following description, like components are denoted with like signs. Also, in cases where the signs are the same, the names and functions are also the same. Consequently, a detailed description of these portions will not be repeated.

First Embodiment

An RF tag antenna 10 and an RF tag 100 according to the first embodiment will be described using the drawings.

Figure 1:
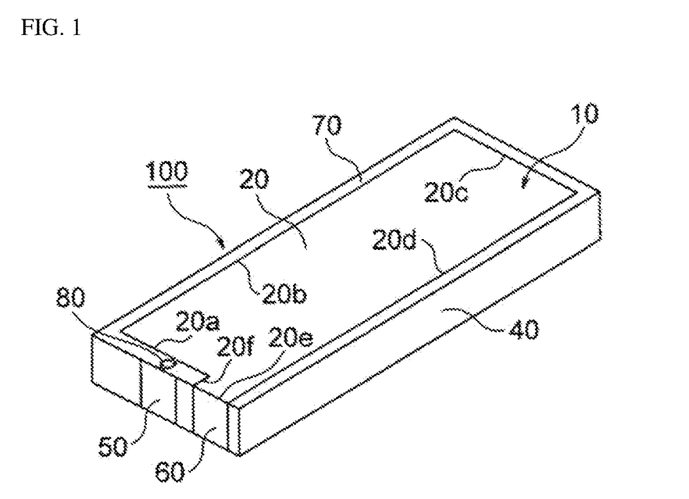
FIG. 1 is a perspective view from above of an RF tag according to a first embodiment.
Figure 2:
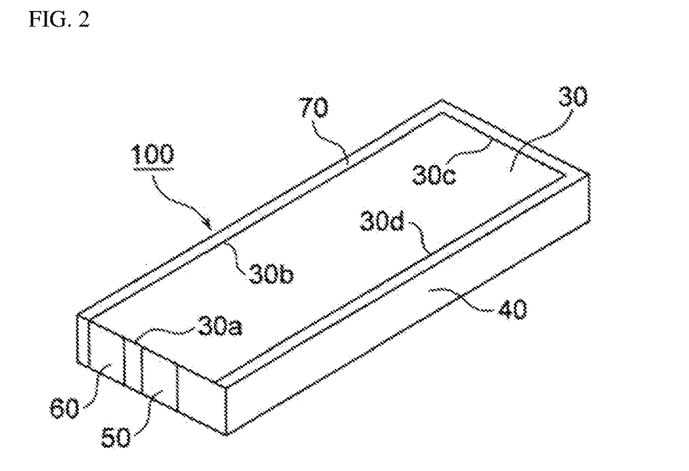
FIG. 2 is a perspective view from below of the RF tag according to the first embodiment.

As illustrated in FIGS. 1 and 2, the RF tag 100 includes the RF tag antenna 10 and an IC chip 80, while the RF tag antenna 10 is provided with a potential difference formation part 20, a ground part 30, a spacer 40, a feeding part 50, and a short-circuit part 60, and forms a planar inverted-F antenna.

The spacer 40 has a top face (first principal surface) and a bottom face (second principal surface) on the opposite side of the first principal surface.

The potential difference formation part 20 is provided on the top face of the spacer 40. The ground part 30 is provided on the bottom face of the spacer 40. The potential difference formation part 20 and the ground part 30 are both rectangular, and are formed by a method such as etching or pattern-printing of a metal thin film such as aluminum.

The potential difference formation part 20 and the ground part 30 have the same shape.

Note that in this specification, "the same shape" is not limited being exactly the same in a strict sense, but also includes cases where a slight difference occurs due to the structure of the antenna. For example, in the case where the IC chip 80 described later is provided in the same plane as the potential difference formation part 20, it is necessary to provide an indentation in a portion of a quadrangular potential difference formation part 20 for example to dispose the IC chip 80, as illustrated in FIG. 1.

In this case, the shapes of the potential difference formation part 20 and the ground part 30 are not strictly the same. However, the potential difference formation part 20 has a quadrangular shape similar to the ground part 30, and therefore the potential difference formation part 20 and the ground part 30 are referred to as having the same shape.

The feeding part 50 is provided on a lateral surface of the spacer 40, with one end electrically connected to the ground part 30. The short-circuit part 60 is provided on a lateral surface of the spacer 40, with one end electrically connected to the potential difference formation part 20 and another end electrically connected to the ground part 30.

As illustrated in FIG. 1, the feeding part 50 and the short-circuit part 60 are members provided parallel to each other on a sheet 70 so as to bridge the potential difference formation part 20 and the ground part 30.

Note that the feeding part 50 and the short-circuit part 60 do not have to be provided parallel to each other. Also, the feeding part 50 and the short-circuit part 60 may also be formed integrally at the same time as the potential difference formation part 20 and the ground part 30. Alternatively, after forming the potential difference formation part 20 and the ground part 30 separately, the ends of each may be joined to the potential difference formation part 20 and the ground part 30.

As illustrated in FIGS. 1 and 2, the potential difference formation part 20, the ground part 30, the feeding part 50, and the short-circuit part 60 are formed on an insulating sheet 70, and are applied to the spacer 40 through the sheet 70 which is bent at the edge portions of the spacer 40.

As described in detail later, the flexible sheet 70 having the potential difference formation part 20, the ground part 30, the feeding part 50, and the short-circuit part 60 formed on one surface thereof can be applied to the spacer 40 by being bent together with the feeding part 50 and the short-circuit part 60, thereby forming the RF tag antenna 10 easily.

Note that a flexible insulating material such as PET, polyimide, or vinyl is usable as the material of the sheet 70. The thickness of the sheet 70 is not particularly limited, but is generally about several dozen micrometers. Additionally, an insulating coating process may also be performed on the surface of each of the waveguide elements 20 and 30.

Also, in the present embodiment, the potential difference formation part 20 and the ground part 30 are formed on the sheet 70 (substrate), but do not necessarily need to be formed on the sheet 70. For example, the potential difference formation part 20 and the ground part 30 may also be formed alone. Alternatively, the potential difference formation part 20 and the ground part 30 formed on the sheet 70 may be applied to the spacer 40, and then the sheet 70 may be peeled off.

A planar inverted-F antenna is formed by the spacer 40, the potential difference formation part 20, the ground part 30, the feeding part 50, and the short-circuit part 60 described above. The planar inverted-F antenna receives radio waves transmitted from a reading device (not illustrated). In the case where the potential difference formation part 20 absorbs radio waves, the ground part 30 acts as a conducting ground plate. On the other hand, in the case where the ground part 30 absorbs radio waves, the potential difference formation part 20 acts as a conducting ground plate. In other words, the potential difference formation part 20 and the ground part 30 are capable of fulfilling the functions of both a waveguide element and a conducting ground plate, depending on the usage pattern of the RF tag 100.

The potential difference formation part 20 is designed such that a total length A of its sides 20*a* to 20*f* (the total length of the sides) is one of $\lambda/4$, $\lambda/2$, $3\lambda/4$, or $5\lambda/8$. Here, $\lambda$ is the wavelength of the radio waves transmitted from the reading device. Note that the wavelength $\lambda$ of the radio waves is not particularly limited insofar as the wavelength is within a usable range as RF tags. The ground part 30 is designed such that a total length B of its sides 30*a* to 30*d* is equal or nearly equal to the total A.

As described above, the potential difference formation part 20 and the ground part 30 have the same shape, and the total lengths A and B of the sides of the waveguide elements 20 and 30 is nearly equal to one of $\lambda/4$, $\lambda/2$, $3\lambda/4$, or $5\lambda/8$. With this arrangement, the sensitivity of the planar inverted-F antenna can be raised.

Also, a resonant circuit can be configured from the inductance formed by the potential difference formation part 20, the short-circuit part 60, the ground part 30, and the feeding part 50, and the capacitance formed by the potential difference formation part 20, the ground part 30, and the spacer 40.

(Usage Pattern of RF Tag 100)

Figure 3:
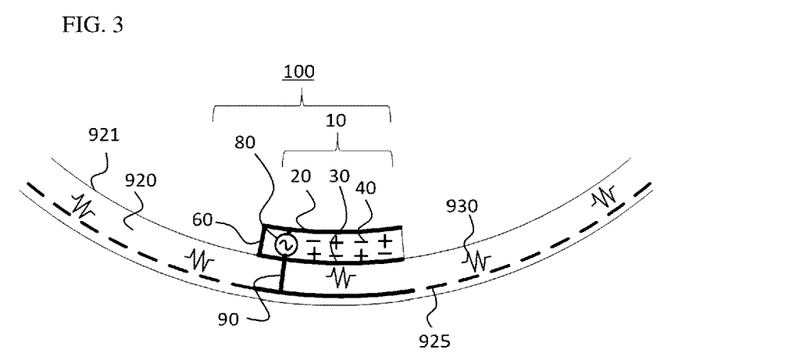
FIG. 3 is a schematic cross section illustrating an example of the RF tag according to the first embodiment.

FIG. 3 is a schematic cross section illustrating an example of the RF tag 100 according to the first embodiment of the present example.

The RF tag 100 according to the present invention is mainly attached to a tire and is capable of transmitting and receiving information with respect to a reader/writer. The IC chip 80 is built into the RF tag antenna 10. The ground part 30 of the RF tag antenna 10 is closely secured to an inner circumferential surface 921 of a tire 920, and the ground part 30 has electrical continuity with a steel wire 925 of the tire 920 through a conductive connecting member 90.

(RF Tag 100 Using Other Antenna)

In the embodiment illustrated in FIGS. 1 to 3, the RF tag antenna 10 forms a planar inverted-F antenna, but the present invention is not limited thereto, and an inverted-L antenna, a patch antenna, and a helical antenna are also usable.

Figure 4:
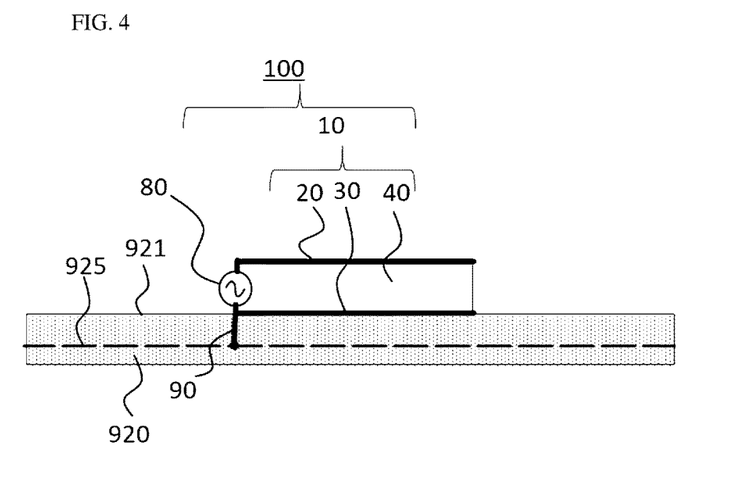
FIG. 4 is a schematic cross section illustrating another example of the RF tag according to the first embodiment.
Figure 5:
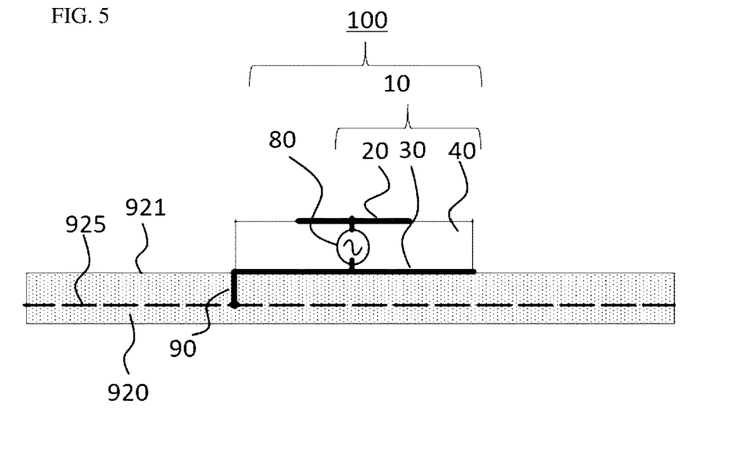
FIG. 5 is a schematic cross section illustrating another example of the RF tag according to the first embodiment.
Figure 6:
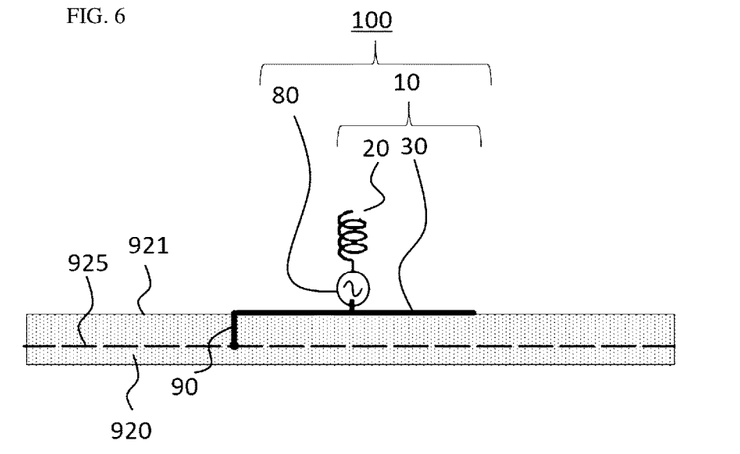
FIG. 6 is a schematic cross section illustrating another example of the RF tag according to the first embodiment.

Schematic cross sections for the case of an inverted-L antenna, a patch antenna, and a helical antenna are illustrated in FIGS. 4 to 6, respectively.

In an inverted-L antenna, the feeding part is at the ends of the potential difference formation part 20 and the ground part 30, and the potential difference formation part 20 and the ground part 30 are connected through the feeding part. In a patch antenna, the feeding part is provided near the center of the potential difference formation part 20 and the ground part 30, and the area of the potential difference formation part 20 is smaller than the area of the ground part 30. Also, in a helical antenna, a helical coil is used as the potential difference formation part 20. Note that in FIGS. 3 to 6, the IC chip 80 indicates the position of the feeding point.

Figure 7:
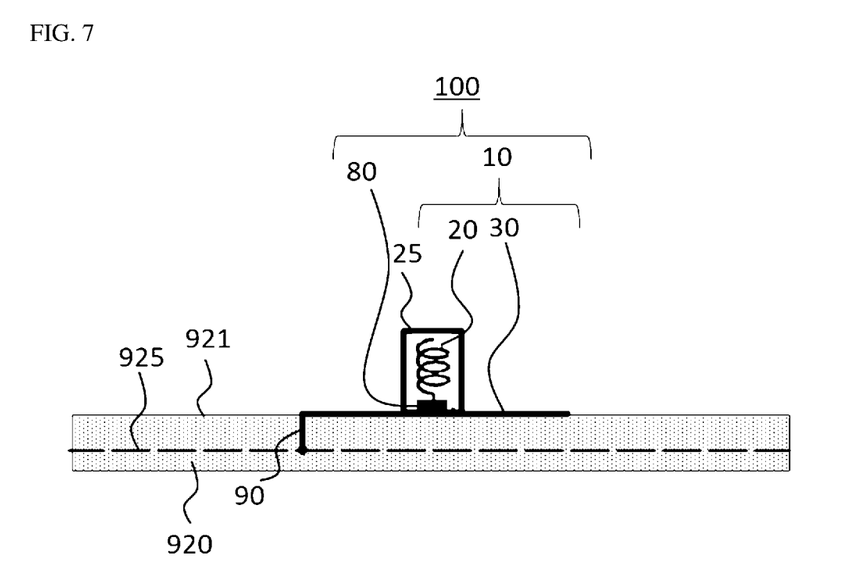
FIG. 7 is a schematic cross section illustrating an embodiment in which a helical coil of the RF tag illustrated in FIG. 6 is covered by a cover.

FIG. 7 is a schematic cross section illustrating an embodiment in which the helical coil (potential difference formation part 20) portion of the RF tag 100 with the helical antenna illustrated in FIG. 6 is covered by an insulator cover 25.

By covering the helical coil portion with the insulator cover 25, resilience against shock and vibration can be raised. Note that in the RF tag 100 with the helical antenna, the IC chip 80 is disposed in the ground part 30, and the feeding output of the IC chip 80 is connected to the helical coil.

In the inverted-F antenna and the inverted-L antenna illustrated in FIGS. 3 and 4, an element that absorbs or radiates radio waves from the steel wire 925 connected to the ground part 30 is provided, and by connecting the ground part 30 to the steel wire 925 like in the present invention, the transmission and reception sensitivity can be improved further.

Also, in the inverted-F antenna and the inverted-L antenna illustrated in FIGS. 3 and 4, by disposing the connection point between the connecting member 90 and the ground part 30 near the connection point between the ground part 30 and the feeder circuit (IC chip 80), the transmission and reception sensitivity of the RF tag can be improved further.

Note that in FIGS. 4 to 7, the tire 920 is drawn with a substantially rectangular shape for simplicity, but the actual shape is the same as the tire 920 in FIG. 3.

Also, FIGS. 13 to 16 are schematic cross sections respectively illustrating the RF tag 100 with the tire 920 of FIGS. 4 to 7 in a curved state similar to FIG. 3, and since these diagrams are otherwise identical to FIGS. 4 to 7, a description will be omitted.

(Ground Part 30)

As illustrated in FIG. 3, the ground part 30 contains a metal thin film of a conductive metal such as aluminum. Generally, the thin film in the present embodiment is formed having a thickness of 3 μm or greater and 35 μm or less. The ground part 30 may also be formed as a metal thin film on a resin film. The ground part 30 is formed by a method such as etching or pattern printing. The ground part 30 has electrical continuity with the steel wire 925 of the tire 920.

(Potential Difference Formation Part 20)

The potential difference formation part 20 contains a metal thin film of a conductive metal such as aluminum. Generally, the thin film in the present embodiment is formed having a thickness of 3 μm or greater and 35 μm or less. The potential difference formation part 20 may also be formed as a metal thin film on a resin film.

The potential difference formation part 20 is formed by a method such as etching or pattern printing. In the present embodiment, the ground part 30 and the potential difference formation part 20 contain the same material.

In other words, the ground part 30 and the potential difference formation part 20 can be formed by cutting and/or working a continuous metal thin film. Note that the ground part 30 and the potential difference formation part 20 may contain the same or different materials.

For example, the metal material contained in the ground part 30 and the metal material contained in the potential difference formation part 20 may be different, or alternatively, the metal material contained in the ground part 30 and the metal material contained in the potential difference formation part 20 may be the same but differentiated by having different thicknesses or by being subjected to different surface treatments.

(IC Chip 80)

The IC chip 80 is disposed between the potential difference formation part 20 and the ground part 30 of the RF tag antenna 10. The IC chip 80 operates on the basis of radio waves received by the planar antenna of the RF tag antenna 10.

Specifically, the IC chip 80 according to the present embodiment first rectifies a portion of a carrier wave transmitted from the reading device, and the IC chip 80 itself generates the power supply voltage needed to operate. Thereafter, the IC chip 80 uses the generated power supply voltage to activate a control logic circuit and non-volatile memory storing data such as unique product information inside the IC chip 80.

The IC chip 80 also activates a component such as a communication circuit for transmitting and receiving data to and from the reading device (reader).

Figure 8:
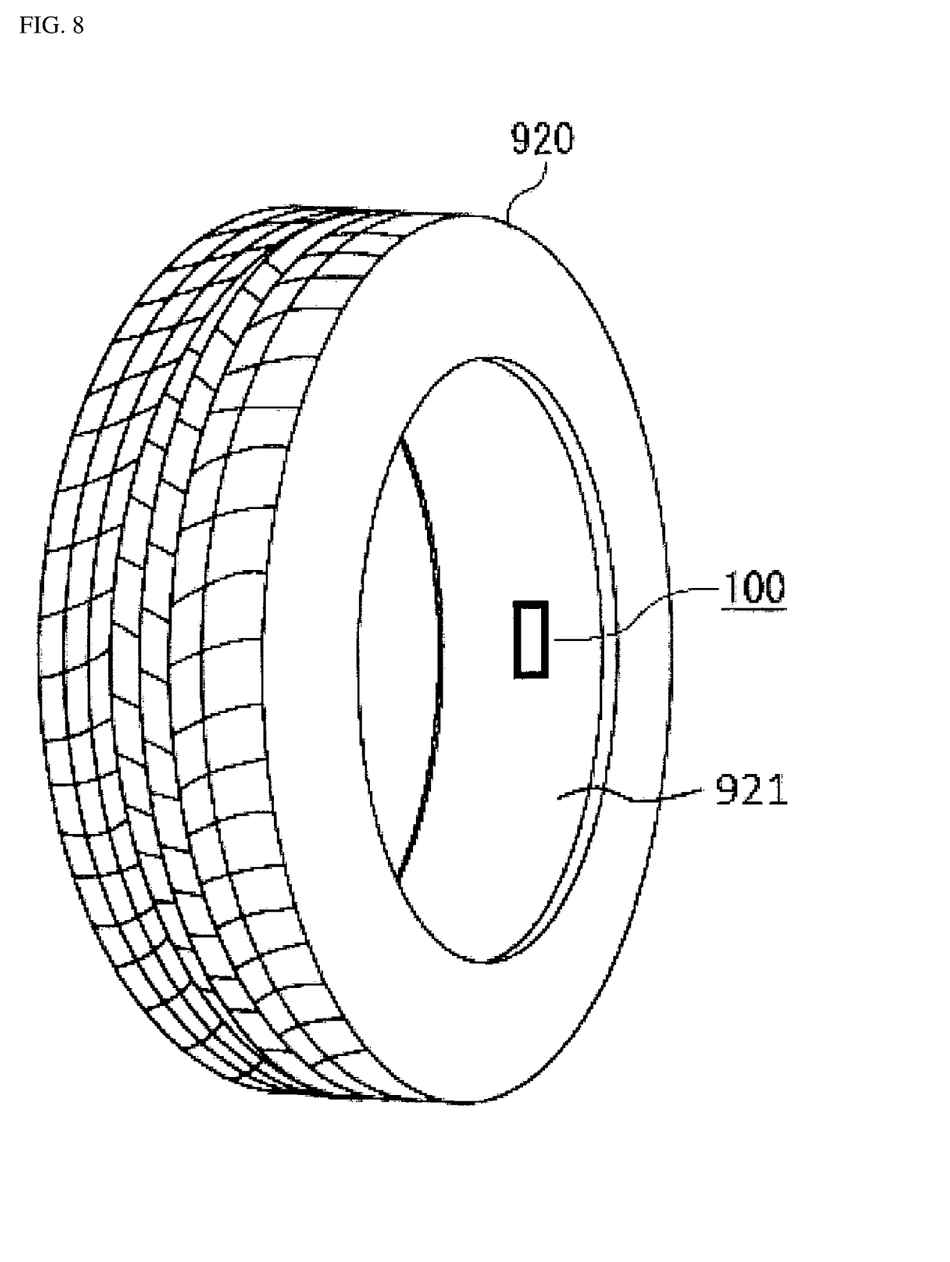
FIG. 8 is a schematic diagram illustrating an example of a usage pattern of the RF tag according to the first embodiment.

In the usage pattern illustrated in FIG. 8, the RF tag 100 is provided on the inner circumferential surface 921 of the tire 920 (of a vehicle such as an automobile, a bicycle, or a motorcycle) containing carbon powder and/or carbon fiber (particularly carbon black). Besides carbon powder, the tire 920 may also contain materials such as rubber (natural rubber or synthetic rubber), a vulcanizing agent, and a bulking agent of the related art. Generally, the carbon powder is mixed in an amount of 40 parts by weight or more and 60 parts by weight or less, particularly 45 parts by weight or more and 55 parts by weight or less with respect to 100 parts by weight of rubber. The RF tag 100 can be affixed to the inner circumferential surface 921 of the tire 920 by using a material such as an adhesive.

Note that because the tire 920 rotates during use, the RF tag 100 preferably is attached to a center portion in the width direction of the inner circumferential surface 921 of the tire 920. The ground part 30 of the RF tag 100 has electrical continuity with the steel wire 925 of the tire 920 through the conductive connecting member 90. Furthermore, the tire 920 is ordinarily stored sideways and in a stack, but because the RF tag 100 according to the present invention contains a resonant circuit configured by the potential difference formation part 20 and the ground part 30, and also because the steel wire 925 and the carbon powder (carbon black) contained in the tire 920 can be used as an antenna by causing the ground part 30 to have electrical continuity with the steel wire 925, information can be transmitted and received even in the case where the tire 920 is stored sideways and in a stack.

In the usage pattern illustrated in FIG. 8, the RF tag 100 is affixed directly to the inner circumferential surface 921 of the tire 920, but in order to achieve quiet operation while in motion, a sponge may also be attached to a center portion of the inner circumferential surface 921, and the RF tag 100 may be secured to the sponge.

Next, the reason for providing the potential difference formation part 20 will be explained using FIG. 3. A usage pattern in which the RF tag 100 is provided in the tire 920 illustrated in FIG. 3 will be described. Also, in the example of FIG. 3, the metallic steel wire 925 is embedded inside the tire 920.

First, a typical tire 920 will be described here.

The hardness of the hard rubber used in a typical tire 920 is maintained by adding carbon powder to vulcanize the rubber. Additionally, carbon powder is known to be used often as an electromagnetic wave absorber.

Consequently, the interior of the tire 920 includes an electromagnetic shield covered by the steel wire 925, and an electromagnetic wave absorber. As a result, in a tire including the steel wire 925 and carbon powder (carbon black) such as the tire 920, transmitting and receiving signals to and from the RF tag 100 is difficult. Consequently, if the RF tag 100 is installed inside the tire 920, the RF tag 100 will have difficulty communicating with equipment outside the tire 920 due to the influence of the steel wire 925 and the carbon powder included in the tire 920.

The inventor has measured the attenuation inside a typical tire 920. As a result, the attenuation is 9 dB in the case of stacking two tires on top of each other, 16 dB in the case of stacking three tires on top of each other, and 23 dB in the case of stacking four tires on top of each other.

In other words, the above demonstrates that in the case of a typical RF tag having a reception sensitivity of −10 dB, the operating sensitivity of the RF tag will not be reached and communication will not be achieved if three or four tires 920 are stacked on top of each other. Also, the above demonstrates that in the case of an RF tag having a reception sensitivity of −20 dB, the operating sensitivity of the RF tag will not be reached and communication will not be achieved if four tires 920 are stacked on top of each other, which is problematic.

Furthermore, in a typical tire 920, a direct-current resistance 930 (see FIG. 3) occurring due to inconsistencies in the carbon powder (carbon black) included in the tire 920 itself varies from several dozen kiloohms to several hundred kiloohms. As a result, the relative dielectric constant changes, and it is necessary to compensate for wavelength variations in each tire 920.

From the above, the inventor discovered and implemented the technical idea of preventing variations in the resonant frequency due to inconsistencies in the carbon powder by bringing a radio wave signal into the RF tag 100 by using the tire 920 itself, particularly the steel wire 925 built into the tire, as an antenna substitute, and also by forming a (LC) resonant circuit with the potential difference formation part 20 and the ground part 30. This point is described hereinafter.

As illustrated in FIG. 8, in the case of attaching the ground part 30 of the RF tag 100 according to the present invention to the inner circumferential surface 921 of the tire 920, a capacitor C can be formed between the potential difference formation part 20 and the ground part 30.

Consequently, a resonant circuit can be formed from the inductance L provided in an antenna 200 and the capacitor C, and variations in the optical total length of the sides of the RF tag 100 due to the carbon powder (carbon black) contained in the tire 920 can be prevented.

Also, by connecting the ground part 30 to the steel wire 925, the steel wire 925 and the carbon powder (carbon black) can be made to act as an antenna to introduce an electric field into the IC chip 80 of the RF tag 100.

In addition, because the steel wire 925 and the carbon powder of the tire 920 can be made to act as an antenna, it is possible to make faulty communication with equipment outside the tire 920 occur less readily, even in cases where the RF tag 100 is installed on the inner side of the tire 920. Furthermore, by setting the capacitor C to a high impedance, the influence of the inconsistencies in the carbon powder for each individual tire can be minimized.

In the present embodiment, the total length of the sides is designed to be the ½ length of the wavelength λ of the frequency to be used. Note that the total length of the sides may also be ¼, ¾, or ⅝ the wavelength λ. The wavelength λ can be calculated from the propagation velocity (speed of light (c))/frequency (F). Specifically, in the case where the frequency is 920 MHz, and given a propagation velocity (the speed of light (c)) of $3\times10^8$ m/s, a value T is equal to $(3\times10^8 \div 9.2\times10^8 \text{ Hz})/2 \approx 0.163$ m, or in other words 163 mm. In this case, the length of each side is adjusted so that the total length of the sides is 163 mm. Note that the total length of the sides is an approximation, and therefore the numerical value itself may have an error of ±5%. This is because the total length of the sides can be made to accommodate the specifications by adjustment, even though the reading distance of the RF tag 100 is shortened.

Additionally, as illustrated in FIG. 3, the RF tag 100 may also include the spacer 40 disposed in the space between the potential difference formation part 20 and the ground part 30.

The spacer 40 preferably contains a lightweight, flexible, heat-resistant member. For example, a foam member (polystyrene foam) or the like is preferable.

Conventionally, it is most preferable to use air instead of the spacer 40, but to maintain a predetermined spacing and prevent contact with the potential difference formation part 20, it is preferable to use polystyrene foam having an air content of 90% by volume or more. More preferably, the polystyrene foam is a closed-cell foam having an air content of 95% by volume or more and 99% by volume or less.

As a result, the air gap with the potential difference formation part 20 can be maintained at a predetermined spacing. Also, the relative dielectric constant of the spacer 40 is desirably in the range from 1 or greater to 20 or less. More desirably, the relative dielectric constant is 1.01 or greater and 1.20 or less, even more desirably 1.01 or greater and 1.10 or less, and most desirably 1.02 or greater and 1.08 or less. In the case of using polystyrene foam as the spacer 40, the expansion ratio of the polystyrene foam is preferably 15 or greater and 60 or less (in this case, the relative dielectric constant is 1.01 or greater and 1.10 or less).

On the other hand, in the case of using a material in which the relative dielectric constant of the polystyrene foam or the like is 1 or greater and 5 or less (particularly 1.01 or greater and 1.20 or less) as the potential difference formation part 20, a large open area of the potential difference formation part 20 can be maintained, and the communication range can be extended from several meters to several dozen meters.

Note that although the spacer 40 contains polystyrene foam in the present embodiment, the configuration is not limited thereto, and insofar as the material is an insulator, another insulating foam or material may be used, such as polyethylene, polyimide, or a thin foam (Volara).

Also, the above embodiment describes a case of using polystyrene foam as the spacer 40, but a dielectric may also be used. For example, a material such as resin, ceramic, or paper may be used as a dielectric. Furthermore, in the case of using ceramic (having a relative dielectric constant greater than 5 and 9 or less) as the spacer 40, the open area of the potential difference formation part 20 is reduced and the communication range is shortened, but the RF tag 100 can be miniaturized. The spacer 40 may also have a bubble or foam shape with one or many cavities formed therein, and may also contain a compound material in which different materials are mixed or layered.

As above, in the RF tag 100 according to the present invention, a potential difference can be formed with respect to the ground part 30 by the potential difference formation part 20. Also, because a tire containing carbon powder (such as the tire 920) is a conductor with high resistance, generally radio wave absorption occurs and communication with the RF tag 100 is unavailable.

However, in the present invention, by forming a (LC) resonant circuit with the potential difference formation part 20 and the ground part 30 and additionally connecting the ground part 30 to the steel wire 925 of the tire 920, the tire containing the steel wire 925 and the carbon powder can be used as a part of the antenna.

Second Embodiment

Figure 9:
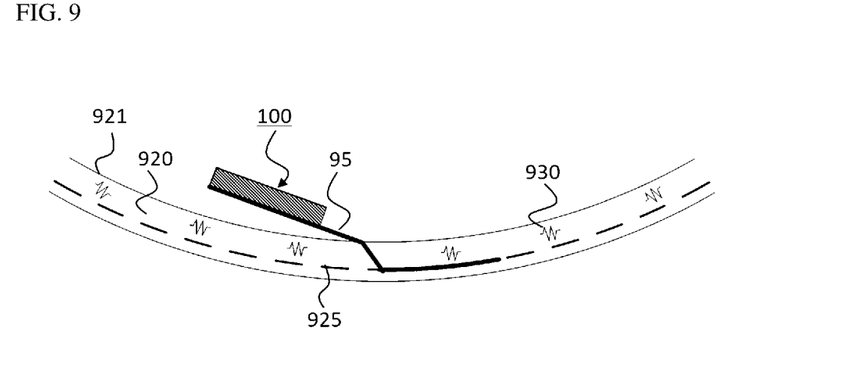
FIG. 9 is a schematic cross section illustrating an example of an RF tag according to a second embodiment.

FIG. 9 is a schematic cross section illustrating an example of the RF tag 100 according to the second embodiment of the present example.

In FIG. 9, the structure of the RF tag 100 itself is the same as the first embodiment.

However, whereas the ground part 30 of the RF tag antenna 10 is closely secured to the inner circumferential surface 921 of the tire 920 in the first embodiment, the second embodiment is different in that the ground part 30 of the RF tag antenna 10 is secured at a distance from the inner circumferential surface 921 of the tire 920 by a conductive shock and vibration absorption member 95.

Also, whereas the ground part 30 and the steel wire 925 have electrical continuity through the conductive connecting member 90 in the first embodiment, the second embodiment is different in that the ground part 30 and the steel wire 925 have electrical continuity through the conductive shock and vibration absorption member 95.

In the second embodiment, by securing the RF tag 100 at a distance from the inner circumferential surface 921 of the tire 920 by the shock and vibration absorption member 95, an effect is obtained whereby the shock and vibration absorption member 95 absorbs shock and vibration caused by obstacles while in motion.

Note that the shock and vibration absorption member is desirably formed using stainless steel, a leaf spring, phosphor bronze, carbon fiber, or a conductive resin.

Additionally, an RF tag 100 provided with an inverted-L antenna, an inverted-F antenna, a patch antenna, or a helical antenna can also be used in the second embodiment.

Figure 17:
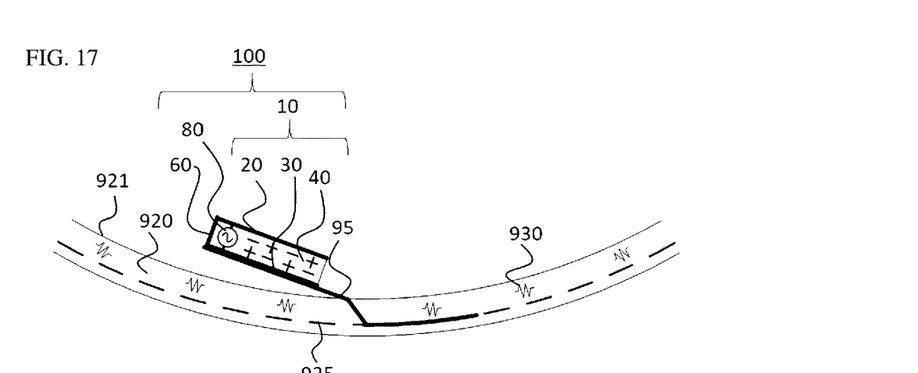
FIG. 17 is a schematic cross section illustrating yet another example of the RF tag according to the second embodiment.

Note that FIG. 17 is a schematic cross section illustrating an example of the RF tag 100 according to the second embodiment provided with an inverted-F antenna.

Third Embodiment

FIGS. 10 to 13 are schematic cross sections illustrating examples of the RF tag 100 according to a third embodiment.

In the third embodiment, the structure of the RF tag 100 itself is the same as the first embodiment.

However, the RF tag 100 is built into the tire, and the ground part 30 of the RF tag antenna 10 is directly and closely secured to and has electrical continuity with the steel wire 925 of a tire with a built-in RF tag. Consequently, the conductive connecting member 90 is not included in the RF tag 100.

In FIGS. 10 to 13, the RF tag 100 is disposed closer to the inner circumferential surface 921 of the tire with a built-in RF tag than the steel wire 925, so as not to be influenced by the electromagnetic shield of the steel wire 925 when transmitting or receiving information from the potential difference formation part 20.

Also, in FIGS. 10 to 13, to avoid the influence of the carbon powder included in the tire, at least the potential difference formation part 20 of the RF tag antenna 10 is disposed inside an antenna protection radome 923 using a bubble material or an insulator having a low dielectric constant.

Furthermore, to improve the transmission and reception sensitivity of the RF tag 100, the potential difference formation part 20 of the RF tag antenna 10 is desirably disposed so as not to contact the radome 923 directly.

Figure 10:
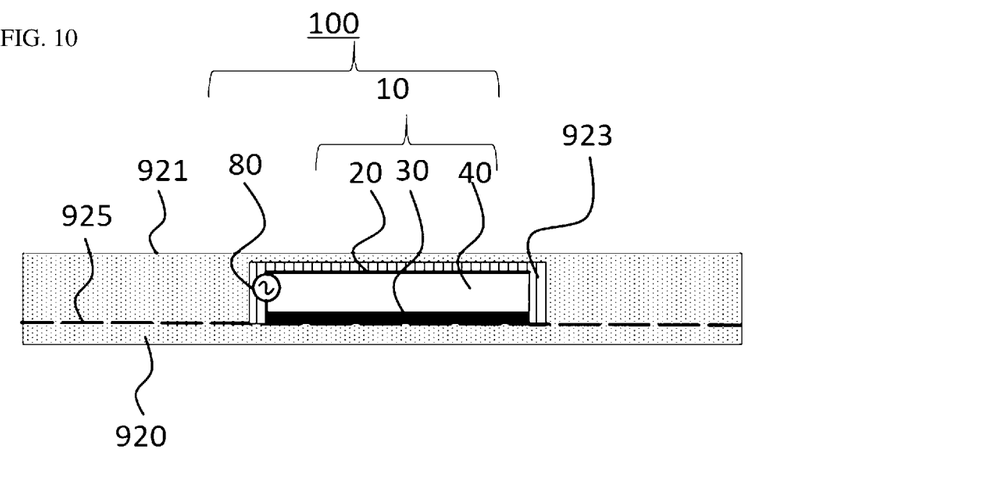
FIG. 10 is a schematic cross section illustrating an example of an RF tag according to a third embodiment.
Figure 11:
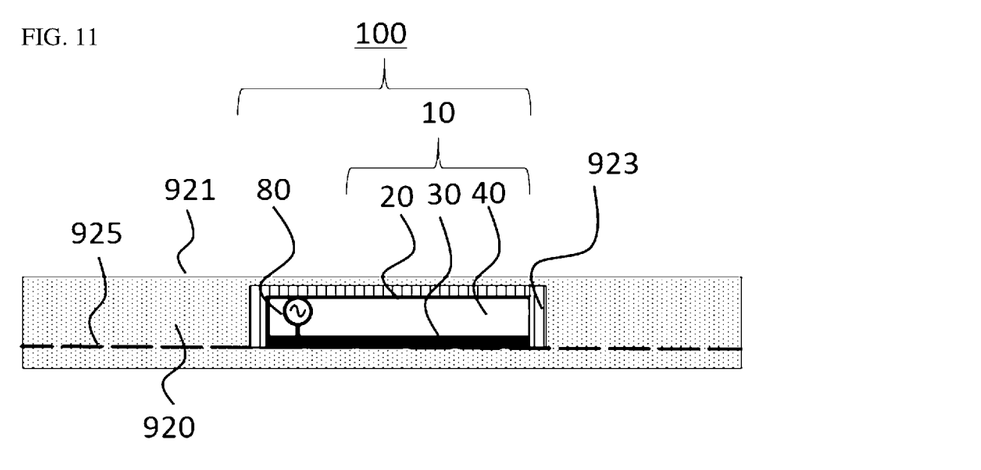
FIG. 11 is a schematic cross section illustrating another example of the RF tag according to the third embodiment.
Figure 12:
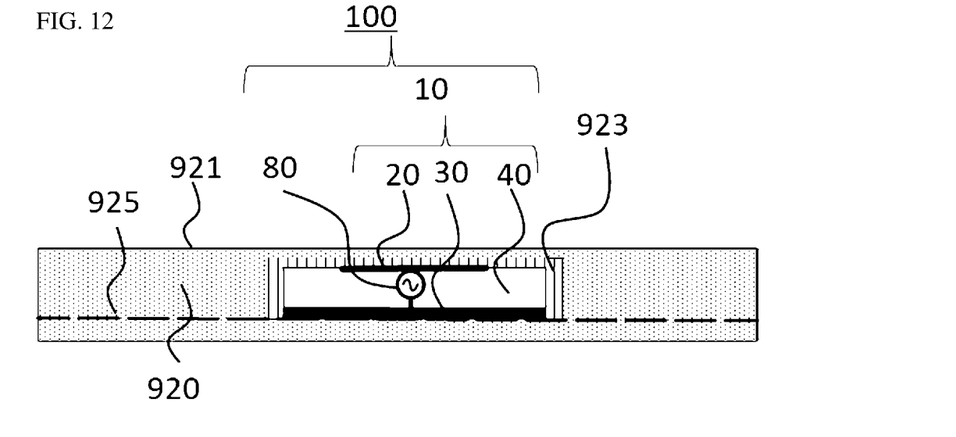
FIG. 12 is a schematic cross section illustrating another example of the RF tag according to the third embodiment.
Figure 13:
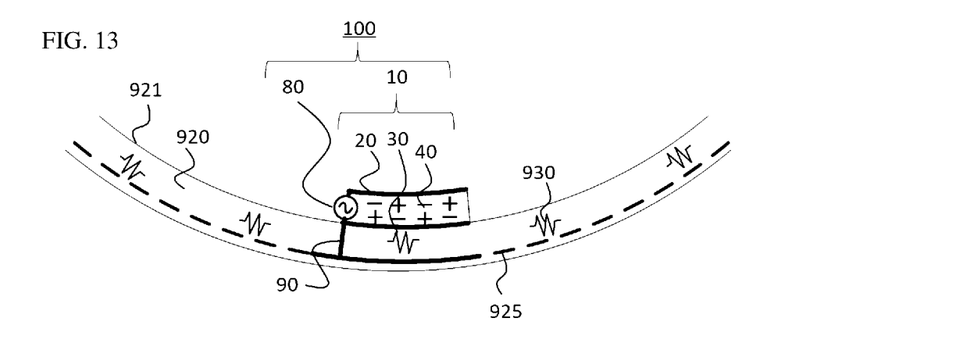
FIG. 13 is a schematic cross section illustrating yet another example of the RF tag according to the first embodiment.
Figure 14:
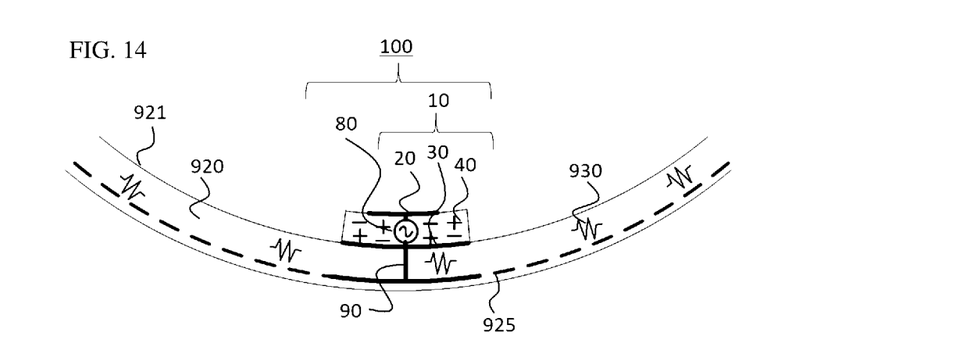
FIG. 14 is a schematic cross section illustrating yet another example of the RF tag according to the first embodiment.
Figure 15:
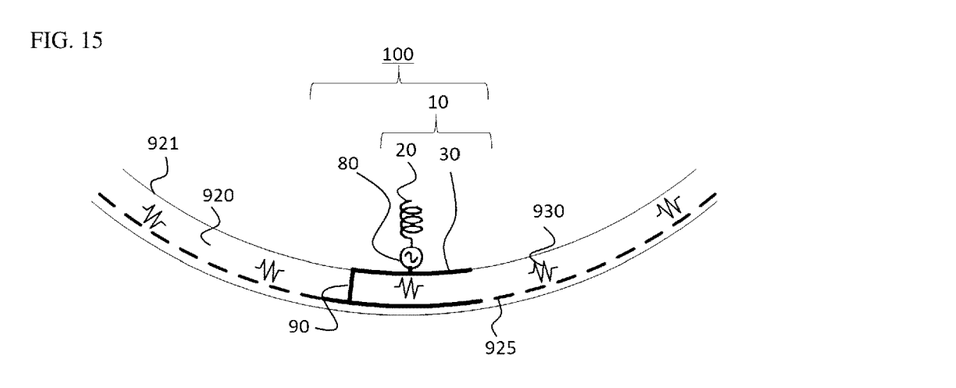
FIG. 15 is a schematic cross section illustrating yet another example of the RF tag according to the first embodiment.
Figure 16:
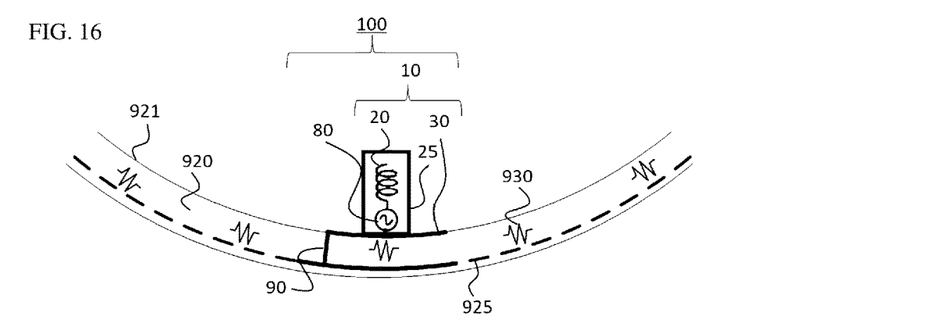
FIG. 16 is a diagram illustrating yet another example of a schematic cross section illustrating an embodiment in which a helical coil of the RF tag illustrated in FIG. 6 is covered by a cover.

FIGS. 10 to 12 are schematic cross sections of a tire with a built-in RF tag containing the RF tag 100 with an inverted-L antenna, an inverted-F antenna, and a patch antenna, respectively.

Note that in FIGS. 10 to 12, the tire 920 is drawn with a substantially rectangular shape for simplicity, but the actual shape is the same as the tire 920 in FIG. 3.

Figure 18:
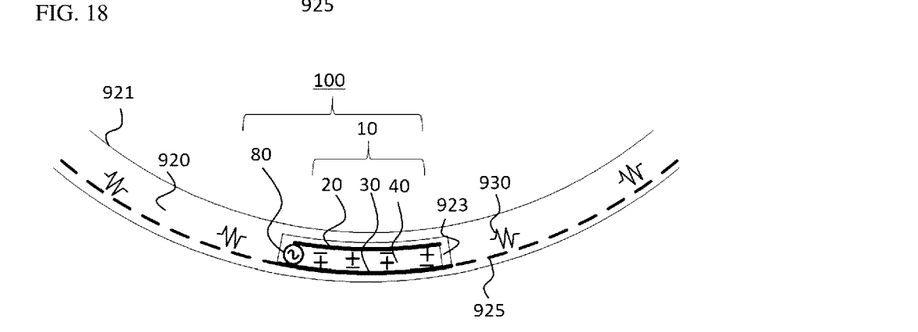
FIG. 18 is a schematic cross section illustrating yet another example of the RF tag according to the third embodiment.
Figure 19:
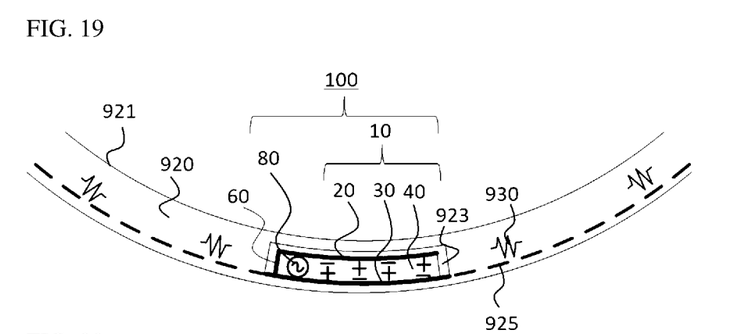
FIG. 19 is a schematic cross section illustrating yet another example of the RF tag according to the third embodiment.
Figure 20:
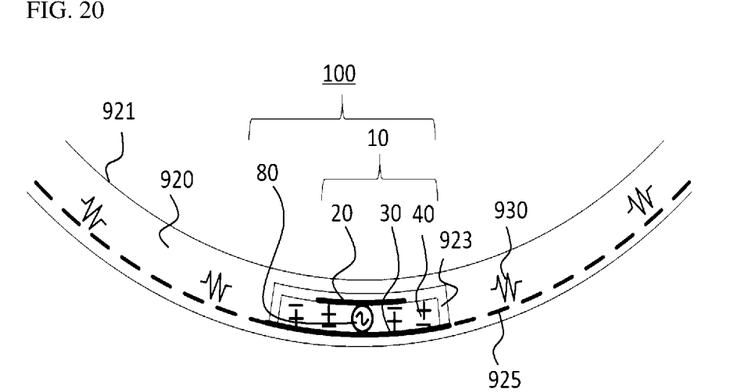
FIG. 20 is a schematic cross section illustrating yet another example of the RF tag according to the third embodiment.

Also, FIGS. 18 to 20 are schematic diagrams respectively illustrating the RF tag 100 with the tire 920 of FIGS. 10 to 12 in a curved state similar to FIG. 3, and since these cross sections are otherwise identical to FIGS. 10 to 12, a description will be omitted.

The first to third embodiments above are provided with a configuration in which the potential difference formation part 20 and the ground part 30 are disposed opposite each other with the spacer 40 containing an insulator in between, and only the ground part 30 is made to have electrical continuity with the steel wire 925 of the tire.

Additionally, by providing the above configuration, the steel wire 925 of the tire which ordinarily acts as an electromagnetic shield and the carbon powder of the tire that acts as an electromagnetic wave absorber can be used as a part of the antenna, and the transmission and reception sensitivity of the RF tag 100 can be improved.

Also, in the first to third embodiments above, by forming a (LC) resonant circuit with the inductance of the RF tag antenna 10 and the capacitor formed by the potential difference formation part 20, the ground part 30, and the spacer 40, variations in the resonant frequency due to inconsistencies of the tire containing the carbon powder can be minimized.

Note that the material of the tire used in the present invention is not limited to a cured resin material or a molded resin material obtained by curing or molding a resin. The tire material can contain at least one selected from the group consisting of resin, rubber, and elastomer. For example, the tire material used for the tire can contain a known synthetic rubber and/or natural rubber.

Furthermore, the antenna can be applied to any of various types of antennas, such as a dipole antenna, a tablet antenna, or a monopole antenna.

In the present invention, the IC chip 80 corresponds to an "IC chip", the RF tag antenna 10 corresponds to an "RF tag antenna", the ground part 30 corresponds to a "ground part", the RF tag 100 corresponds to an "RF tag", the potential difference formation part 20 corresponds to a "potential difference formation part", the spacer 40 corresponds to a "spacer", and the steel wire 925 corresponds to a "steel wire".

The foregoing describes preferred embodiments of the present invention, but the present invention is not limited thereto. It should be understood that various embodiments are possible without departing from the spirit and scope of the present invention. Furthermore, actions and effects obtained by a configuration of the present invention are described in the foregoing embodiments, but these actions and effects are merely examples and do not limit the present invention.

REFERENCE SIGNS LIST

10 RF tag antenna
20 potential difference formation part
30 ground part
40 spacer
50 feeding part
60 short-circuit part
80 IC chip
90 conductive connecting member
95 conductive shock and vibration absorption member
100 RF tag
920 tire
921 inner circumferential surface
925 steel wire
930 direct-current resistance

What is claimed is:

1. An RF tag antenna used by being attached to a tire including carbon powder and a steel wire,
the RF tag antenna comprising:
a ground part; and
a potential difference formation part that forms a potential difference with respect to the ground part, wherein
the potential difference formation part and the ground part are disposed opposite each other with a spacer containing an insulator in between,
a resonant circuit that resonates in a frequency band of radio waves to be received is formed by an inductance of the RF tag antenna and a capacitance of a capacitor formed by the potential difference formation part, the ground part, and the spacer, and only the ground part has electrical continuity with the steel wire.

2. The RF tag antenna according to claim 1, wherein the RF tag antenna is a planar inverted-F antenna, and is provided with a short-circuit part that provides electrical continuity between the potential difference formation part and the ground part on a lateral surface of the spacer, and a feeding part that feeds power to the potential difference formation part and the ground part.

3. The RF tag antenna according to claim 2, wherein the inductance of the RF tag antenna is formed by the potential difference formation part, the ground part, the short-circuit part, and the feeding part.

4. The RF tag antenna according to claim 1, wherein the RF tag antenna is an inverted-L antenna, a patch antenna, or a helical antenna.

5. The RF tag antenna according to claim 1, wherein the ground part and the potential difference formation part are each formed from a continuous flat plate.

6. The RF tag antenna according to claim 1, wherein a total length of the sides of the potential difference formation part is one of $\lambda/4$, $\lambda/2$, $3\lambda/4$, or $5\lambda/8$, where $\lambda$ is a wavelength of a radio wave to be transmitted from a reading device.

7. An RF tag antenna with a connecting member comprising the RF tag antenna according to claim 1 and a conductive connecting member, wherein the ground part of the RF tag antenna is closely secured to an inner circumferential surface of the tire, and the steel wire and the ground part have electrical continuity through the conductive connecting member.

8. The RF tag antenna with a connecting member according to claim 7, wherein a connection point between the conductive connecting member and the ground part is disposed near the feeding part on the ground part side.

9. An RF tag antenna with a shock and vibration absorption member comprising the RF tag antenna according to claim 1 and a conductive shock and vibration absorption member, wherein the ground part of the RF tag antenna is secured at a distance from an inner circumferential surface of the tire by the shock and vibration absorption member, and the ground part and the steel wire have electrical continuity through the shock and vibration ab sorption member.

10. The RF tag antenna with a shock and vibration absorption member according to claim 9, wherein the shock and vibration absorption member is formed using stainless steel, a leaf spring, phosphor bronze, carbon fiber, or a conductive resin.

11. An RF tag comprising:

the RF tag antenna according to claim 1; and an IC chip provided in the RF tag antenna.

12. An RF tag comprising:

the RF tag antenna with a connecting member according to claim 7; and an IC chip provided in the RF tag antenna with a connecting member.

13. An RF tag comprising:

the RF tag antenna with a shock and vibration absorption member according to claim 9; and an IC chip provided in the RF tag antenna with a shock and vibration absorption member.

14. A tire comprising the RF tag according to claim 12.

15. A tire with a built-in RF tag containing the RF tag according to claim 11, wherein the ground part of the RF tag antenna is directly secured to the steel wire inside the tire, and the RF tag is embedded closer to an inner circumferential surface than the steel wire in the tire with a built-in RF tag.

16. The tire with a built-in RF tag according to claim 15, wherein at least the potential difference formation part of the RF tag antenna is disposed inside an antenna protection radome using a bubble material or an insulator having a low dielectric constant, and is configured so as not to contact the rubber of the tire with a built-in RF tag directly.

17. The tire with a built-in RF tag according to claim 16, wherein the potential difference formation part of the RF tag antenna is disposed at a predetermined distance from the antenna protection radome, and is configured so as not to contact the antenna protection radome directly.

* * * * *